United States Patent [19]

Fischer et al.

[11] Patent Number: 4,933,163
[45] Date of Patent: Jun. 12, 1990

[54] PROCESS OF REMOVING HYDROGEN SULFIDE FROM EXHAUST GAS

[75] Inventors: Herbert Fischer, Lollar; Manfred Kriebel, Frankfurt am Main, both of Fed. Rep. of Germany

[73] Assignee: Metallgesellschaft AG, Frankfurt am Main, Fed. Rep. of Germany

[21] Appl. No.: 247,029

[22] Filed: Sep. 20, 1988

[30] Foreign Application Priority Data

Oct. 16, 1987 [DE] Fed. Rep. of Germany ....... 3735002

[51] Int. Cl.$^5$ ................... C01B 17/04; C01B 3/04; C01B 31/18
[52] U.S. Cl. ................... 423/574 R; 422/176; 423/415 A; 423/576.8; 423/648.1; 423/650; 431/8; 431/10
[58] Field of Search ............. 422/176; 423/574 R, 423/576.8, 415 A, 648.1, 650, 655; 110/348; 431/8, 10

[56] References Cited

U.S. PATENT DOCUMENTS

| 2,200,529 | 5/1940 | Baehr et al. | 423/576.8 |
| 3,209,811 | 10/1965 | Strang | 431/8 |
| 3,298,785 | 1/1967 | Reul | 431/8 |
| 3,364,970 | 1/1968 | Dombruch et al. | 431/8 |
| 3,733,165 | 5/1973 | Nakagawa et al. | 431/10 |
| 3,851,050 | 11/1974 | Groenendaal et al. | 423/574 R |
| 3,860,697 | 1/1975 | Palm | 423/574 R |
| 4,035,158 | 7/1977 | Scott et al. | 423/574 R |
| 4,097,585 | 6/1978 | Fischer | 423/574 R |
| 4,117,100 | 9/1978 | Hellmer | 423/574 R |
| 4,394,119 | 7/1983 | Waller et al. | 423/574 R |
| 4,481,181 | 11/1984 | Norman | 423/576.8 |
| 4,501,725 | 2/1985 | Lell | 423/574 R |
| 4,575,453 | 3/1986 | Reed | 423/574 R |
| 4,632,819 | 12/1986 | Fischer et al. | 423/574 R |
| 4,780,305 | 10/1988 | Steppe | 423/574 R |
| 4,797,087 | 1/1989 | Gitman | 431/10 |

FOREIGN PATENT DOCUMENTS

| 708041 | 4/1954 | United Kingdom | 423/576.8 |
| 2048456 | 12/1980 | United Kingdom | 431/10 |

OTHER PUBLICATIONS

Raymont, "Role of hydrogen in Claus plants." Hydrocarbon Processing, May 1975, pp. 177–179.
Parnell, "Look at Claus Unit Design," Hydrocarbon Processing, Sep. 1985, pp. 114–118.

Primary Examiner—John Doll
Assistant Examiner—Jeffrey Edwin Russel
Attorney, Agent, or Firm—Sprung Horn Kramer & Woods

[57] ABSTRACT

A feed gas which contains $H_2S$ is combusted with oxygen and air in at least one burner, which opens into a combustion chamber. The resulting gas mixture contains $H_2S$ and $SO_2$ and is intended to be converted to elementary sulfur by the Claus process. The combustion chamber is supplied with oxygen through a central tube of the burner, with the $H_2S$-containing feed gas through a second tube, which coaxially surrounds the central tube, and with air through a coaxial outer tube. The feed gas supplied to the burner contains $H_2S$ and at least 5% by volume hydrocarbons or $CO_2$. Velocities of flow of oxygen of 50 to 250 m/sec. and of the $H_2S$-containing feed gas of 10 to 30 m/sec. are adjusted at the outlet of the burner. Temperatures in the range from 2000° to 3000° C. are generated in the core zone of the burner flame. A gas mixture which contains at least 2% by volume CO and at least 8% by volume $H_2$ and is at temperatures from 1350° to 1650° C. is withdrawn from the combustion chamber.

3 Claims, 1 Drawing Sheet

PROCESS OF REMOVING HYDROGEN SULFIDE FROM EXHAUST GAS

BACKGROUND OF THE INVENTION

This invention relates to a process of combusting an $H_2S$-containing feed gas with oxygen and air in at least one burner, which opens into a combustion chamber, to produce a gas mixture which contains $H_2S$ and $SO_2$ and is intended to be converted to sulfur by the Claus process, wherein the combustion chamber is supplied with oxygen through the central tube of the burner, with the $H_2S$-containing feed gas through at least one second tube, which coaxially surrounds the central tube, and with air through a coaxial outer tube.

Such a process and related equipment have been described in German Patent 34 30 015. In that known process, relatively low temperatures and low velocities of flow of the gases are maintained adjacent to the outlet of the burner.

SUMMARY OF THE INVENTION

It is an object of the invention to permit the processing of an $H_2S$-containing feed gas which contains also hydrocarbons or $CO_2$. In the process described first hereinbefore this is accomplished in accordance with the invention in that the burner is supplied with an $H_2S$-containing feed gas which contains at least 5% by volume hydrocarbons or $CO_2$, velocities of flow of oxygen of 50 to 250 m/sec and of the $H_2S$-containing feed gas of 10 to 30 m/sec are adjusted at the outlet of the burner, temperatures in the range from 2000° to 3000° C. are generated in the core zone of the burner flame, and a gas mixture which contains at least 2% by volume CO and at least 8% by volume $H_2$ and is at temperatures from 1350° to 1650° C. is withdrawn from the combustion chamber.

Owing to the high temperatures, a substantial quantity of carbon dioxide is broken down to carbon monoxide and oxygen and part of the water is also broken down to hydrogen and oxygen. As a result, part of the oxygen is made available which is required to maintain the high temperatures that are required adjacent to the burner flame and in the combustion chamber so that the total oxygen demand will be low. The hydrogen contained in the product gas mixture from the combustion chamber is valuable in the further processing of the gas mixture because hydrogenating reactions can be performed without an addition of extraneous hydrogen. Besides, the gaseous components $H_2$ and CO constitute a valuable product as a synthesis gas.

In accordance with a desirable further feature of the invention, the gas mixture from the combustion chamber is conducted through a Claus zone, in which $H_2S$, $H_2$ and CO are withdrawn from the hydrolysis zone, and $H_2S$ is separated from the last-mentioned gas mixture. Said further processing stages may be operated in known manner. Details of said processing stages have been described in Published German Application 34 15 722 and the corresponding U.S. Pat. No. 4,632,819 and in Ullmanns Encyklopadie der technischen Chemie, 4th edition (1982), Volume 21, pages 8 to 26 and are incorporated herein by reference.

Possible embodiments of the process will be explained with reference to the drawing, in which:

DETAILED DESCRIPTION OF THE INVENTION

Figure 1:
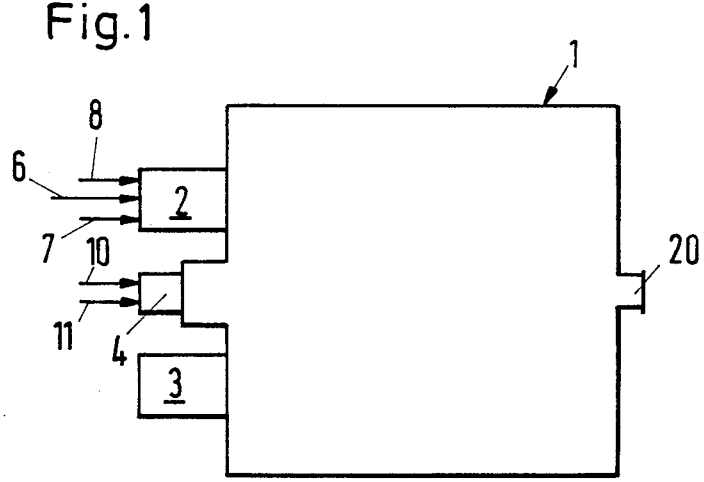
FIG. 1 is a diagrammatic longitudinal sectional view showing the combustion chamber according to the invention.

The combustion chamber 1 comprises a plurality of burners 2, 3 and known pilot burner 4. The burner 2 is suppied with oxygen through line 6, with the feed gas through line 7 and with air through line 8. For the sake of clearness, the identical supply lines connected to the burner 3 have been omitted. The pilot burner 4 is supplied with fuel through line 10 and with air through line 11.

Figure 2:
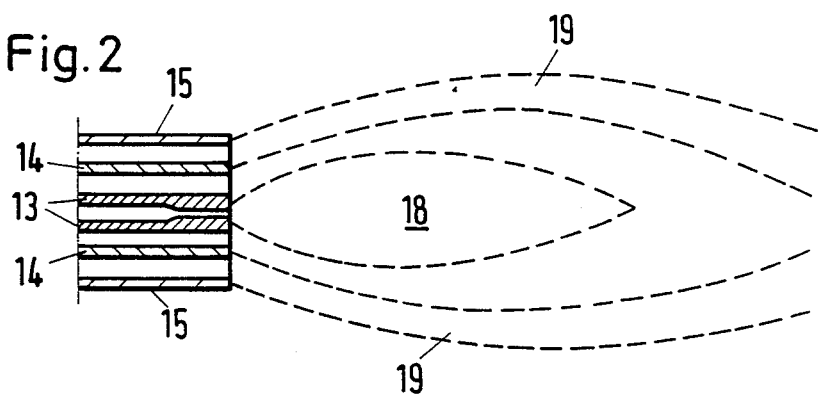
FIG. 2 is a longitudinal sectional view showing the outlet portion of the burner according to the invention.

The outlet portion of a burner consists of concentric tubes, which are shown in FIG. 2. Oxygen flows through the central tube 13, which is constricted at its outlet, and leaves the tube at velocities of flow mounting to 50 to 250 m/sec. The central tube 13 is surrounded by a second tube 14, through which the feed gas is supplied to the combustion. The feed gas contains $H_2S$ as well as at least 5% by volume hydrocarbons or $CO_2$. The feed gas leaves the second tube 10 at a velocity of 10 to 30 m/sec. Air is supplied through the outer tube 15.

The desired reactions are promoted by the flame structure which results from the burner design, the nature of the gases and their velocities of flow. Temperatures in the range from 2000° to 3000° C., preferably of at least 2300° C., are obtained in the core zone 18 of the burner flame so that the conversion of $CO_2$ to CO and oxygen and the thermal decomposition of water will be promoted. Being at relatively low temperatures, the air envelope 19 which surrounds the hot portion of the flame protects the refractory lining of the combustion chamber and restrains the cooling of the core portion 18 of the flame. The temperatures in the air envelope 19 of the flame are approximately in the range from 800 to 1300° C.. Temperatures from about 1350° to 1650° C. will be obtained adjacent to the outlet 20 of the combustion chamber. The gas mixture which is at said temperatures contains at least 2% by volume carbon monoxide and at least 8% by volume hydrogen. Said gas mixture also contains $SO_2$, which has been produced by the combustion of part of the $H_2S$.

Figure 3:
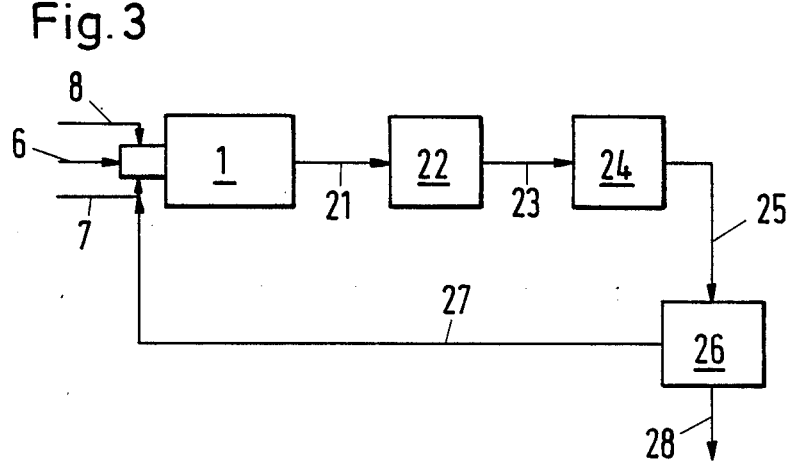
FIG. 3 is a flow scheme illustrating the gas treatment according to the invention.

In accordance with FIG. 3 the gas mixture from the combustion chamber 1 is fed through line 21 to a Claus plant 22, in which $H_2S$ and $SO_2$ are reacted on catalysts to form elementary sulfur in known manner at temperatures decreasing from an initial value of about 320° C. to a final value of about 200° C. The known catalysts consist, e.g., substantially of $TiO_2$ and $Al_2O_3$, which constitute different fixed beds. The exhaust gas from the Claus plant is conducted in line 23 to a hydrolysis zone 24, in which the components of the gas mixture are subjected to hydrolyzing and hydrogenating treatments. As the exhaust gas contains enough hydrogen, extraneous hydrogen need not be supplied for that hydrogenation.

The following remarks are made on the hydrolysis zone and the hydrogenation which is effected in that zone at the same time: Residual COS and $CS_2$ are hydrolyzed with steam to $H_2S$ on a catalyst which consists, e.g., of an $Al_2O_3$ support impregnated with Co and Mo. Residual elementary sulfur and $SO_2$ are reacted with hydrogen to form $H_2S$ at the same time. The hydrolysis and the hydrogenation are effected on the same catalyst, which constitutes a fixed bed, at temperatures from about 300° to 350° C. The treated gas now consists substantially of $H_2S$, $N_2$, CO and $H_2$. That gas mixture is supplied through line 25 to a separating plant 26, in which $H_2S$ is separated, e.g., by chemical adsorption, e.g., by means of methyl diethylenamines (MDEA). Separated $H_2S$ is recycled in line 27 to the combustion chamber 1. CO, $H_2$ and $N_2$ are available as mixed gases in line 28 for further use.

EXAMPLES

A combustion chamber provided with four burners is supplied with a feed gas having the following composition on a dry basis:

| | |
|---|---|
| $H_2S$ | 86.0% by volume |
| CO | 0.2% by volume |
| $CH_4$ | 1.0% by volume |
| $CO_2$ | 10.7% by volume |
| $N_2$ | 2.0% by volume |
| $H_2$ | 0.1% by volume |

In cases A, B and C, said feed gas is combusted in part at different air-oxygen ratios. The oxygen which is employed is technically pure and leaves the respective burner at a velocity of flow from 150 to 200 m/sec. The velocity of flow of the feed gas at the outlet of the burner is about 20 to 25 m/sec. The rates stated in the following Tables are related to 1000 $sm^3$ of dry feed gas.

| | A | B | C |
|---|---|---|---|
| Air rate ($sm^3$) | 438 | 182 | 105 |
| Oxygen rate ($sm^3$) | 254 | 296 | 309 |
| Nitrogen-oxygen volume ratio | 1:1 | 0.4:1 | 0.25:1 |
| Temperature at outlet of combustion chamber (°C.) | 1427 | 1480 | 1497 |
| Maximum flame temperature (°C.) | 2500 | 2600 | 2800 |

The gas mixture leaving the combustion chamber 1 is composed as follows (% by volume):

| | A | B | C |
|---|---|---|---|
| $H_2S$ | 8.3 | 9.5 | 9.9 |
| $SO_2$ | 4.8 | 5.5 | 5.7 |
| $H_2O$ | 41.0 | 46.6 | 48.6 |
| COS | 0.8 | 0.9 | 1.0 |
| $CS_2$ | 0.2 | 0.3 | 0.3 |
| CO | 3.5 | 4.5 | 4.8 |
| $CO_2$ | 3.6 | 3.8 | 3.9 |
| $H_2$ | 10.9 | 14.2 | 15.4 |
| $N_2$ | 25.0 | 13.0 | 8.6 |
| Other Sulfur compounds | 1.9 | 1.7 | 1.8 |
| | 100.0 | 100.0 | 100.0 |
| Gas rate: | | | |
| without elementary sulfur ($sm^3$) | 1436 | 1232 | 1172 |
| with elementary sulfur ($sm^3$) | 1761 | 1558 | 1498 |

That gas mixture is subjected to a two-stage Claus gas catalysis, in which $TiO_2$ in the first stage and $Al_2O_3$ in the second stage are used as catalysts. 97% of the sulfur are recovered by that catalysis.

The exhaust gas from the Claus gas catalysis is hydrogenated and hydrolyzed in the following procedure:

The gas mixture is reheated to 320° C. and is fed to a reactor in which hydrogenation and hydrolysis are effected on one and the same catalyst ($A_2O_3$ impregnated with Co and Mo). After that treatment the gas mixture contains sulfur compounds only in the form of $H_2S$ and the water that has been formed in the reactions has been removed to a residual content of 4% by volume. The gas mixture is subsequently fed to a separating plant, in which the $H_2S$ is removed to a residual content of about 10 ppm by volume by means of MDEA in the Sulften process of Ford, Bacon and Davis Inc. in Dallas, U.S.A. The remaining gas obtained in line 28 is composed as follows:

| | A | B | C |
|---|---|---|---|
| $H_2$ | 19.1 | 29.7 | 14.8 |
| CO | 6.9 | 10.5 | 12.2 |
| $CO_2$ | 8.9 | 11.1 | 12.2 |
| $N_2$ | 61.1 | 44.7 | 36.8 |
| $H_2O$ | 4.0 | 4.0 | 4.0 |

That gas mixture, particularly the mixtures obtained in Examples B and C, can be used, e.g., in the hydrogenating desulfurization of petroleum products or as a fuel gas.

What is claimed is:

1. A process of combusting an $H_2S$-containing feed gas with oxygen and air in at least one burner, which opens into a combustion chamber, to produce a gas mixture which contains $H_2S$ and $SO_2$ for conversion to sulfur by the Claus process, wherein the combustion chamber is supplied with oxygen through the central tube of the burner, with the $H_2S$-containing feed gas through at least one second tube, which coaxially surrounds the central tube, and with air through a coaxial outer tube, where in the burner is supplied with an $H_2S$-containing feed gas which contains at least 5% by volume hydrocarbons or $CO_2$, velocities of flow of oxygen of 50 to 250 m/sec and of the $H_2S$-containing feed gas of 10 to 3 m/sec are adjusted at the outlet of the burner, temperatures in the range from 2000° to 3000° C. are generated in the core zone of the burner flame, and a gas mixture which contains at least 2% by volume CO and at least 8% by volume $H_2$ and is at temperatures from 1350 to 1650° C. is withdrawn from the combustion chamber.

2. A process according to claim 1, wherein the gas mixture from the combustion chamber is conducted through a Claus zone, in which $H_2S$ and $SO_2$ are catalytically converted to elementary sulfur, the exhaust gas from the Claus zone is subjected to a hydrogenating treatment in a hydrolysis zone, a gas mixture which predominantly consists of $H_2S$, $H_2$ and CO is withdrawn from the hydrolysis zone, and $H_2S$ is separated from the last-mentioned gas mixture.

3. A process according to claim 2, wherein the $H_2S$ that has been separated from the last-mentioned gas mixture is recycled to the burner.

* * * * *